Patented Oct. 20, 1931

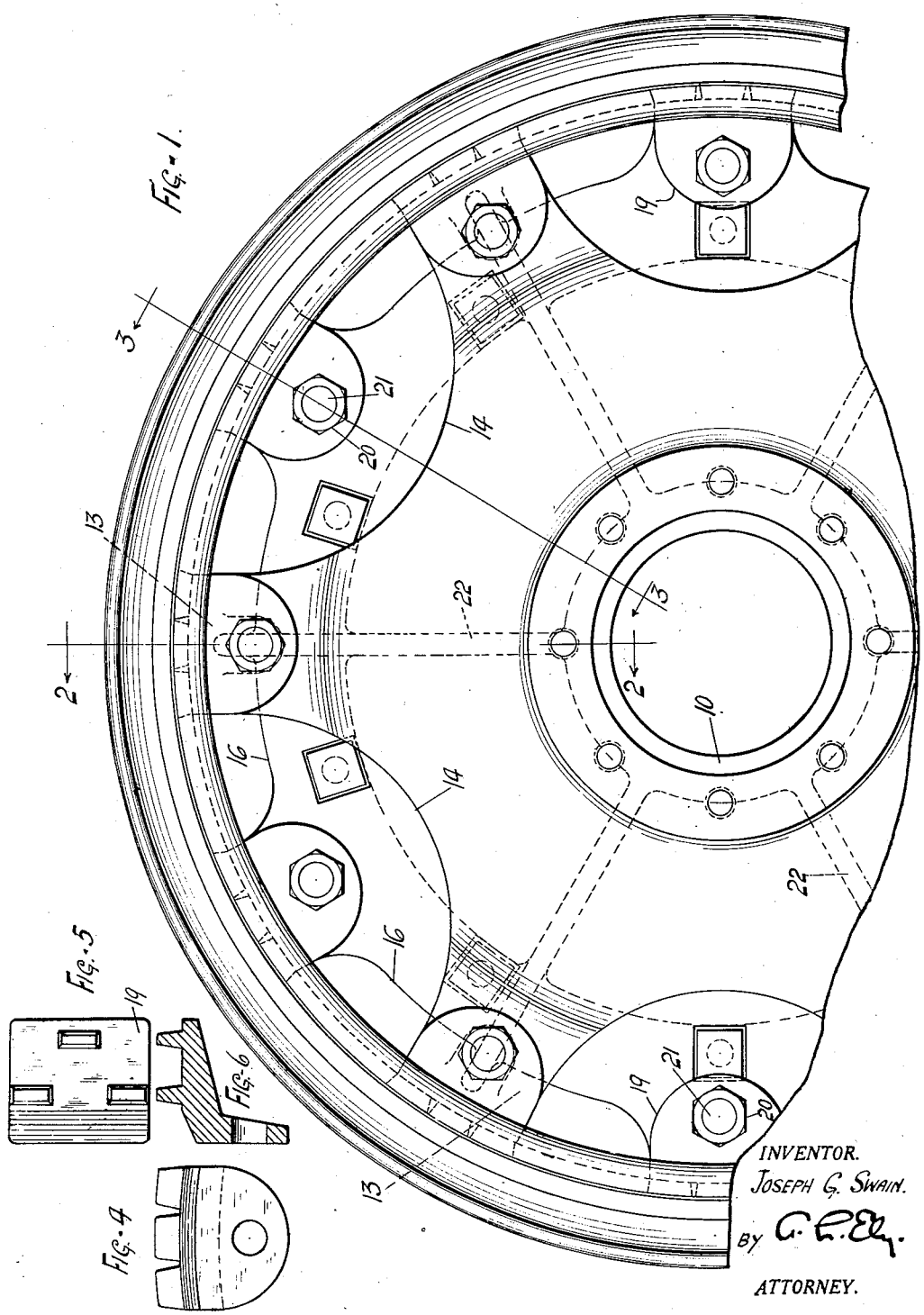

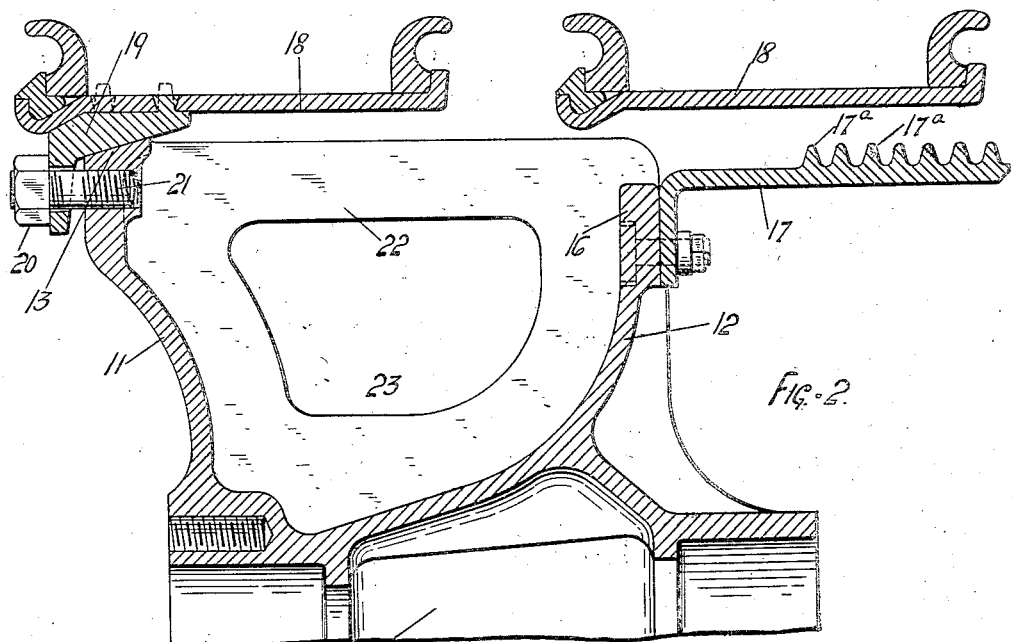
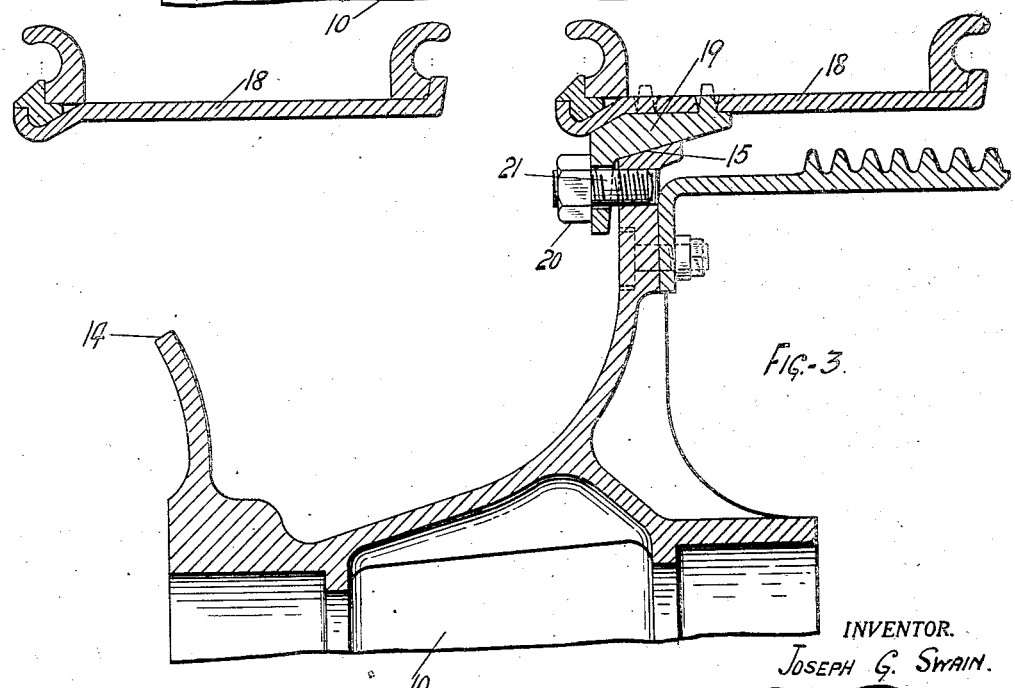

1,828,162

UNITED STATES PATENT OFFICE

JOSEPH G. SWAIN, OF AKRON, OHIO, ASSIGNOR TO THE FIRESTONE STEEL PRODUCTS COMPANY, OF AKRON, OHIO, A CORPORATION OF OHIO

DUAL WHEEL AND DEMOUNTABLE RIM

Application filed December 9, 1925. Serial No. 74,302.

This invention relates to dual wheels and demountable rim equipment therefor.

One purpose of the invention is to devise a dual wheel adapted to have demountable attached clamp rims readily mounted thereon or removed therefrom.

Another purpose of the invention is to provide in such a wheel axially spaced rim seats with means between the seats on which the inner rim may be slid into position on the inner seat.

Another purpose is to provide in a dual wheel means for maintaining a circulation of air about the inner surfaces of the rims to dissipate heat generated in the wheel brakes in such a manner as to prevent blistering of the tires which has heretofore resulted in the operation of busses or trucks.

The foregoing and other objects are obtained by the construction shown in the accompanying drawings and described below. It is to be understood that the invention is not limited to the specific form thereof shown and described.

Of the accompanying drawings:

Figure 1 is a side elevation of a portion of a wheel embodying the invention;

Figure 2 is a radial section on line 2—2 of Figure 1;

Figure 3 is a radial section on line 3—3 of Figure 1;

Figures 4, 5 and 6 are respectively a side elevation, a plan and a vertical section of a clamp adapted to be attached to the demountable rim shown by a riveting operation.

Referring to the drawings, 10 represents the hub of a metallic dual wheel formed with an outer web portion 11 and an inner web portion 12. The outer web 11 is formed with outwardly inclined rim seats 13, 13 equally spaced about the wheel and is cut away as at 14, 14 between said seats to permit mounting of a rim on the inner side of the wheel as will be explained.

The inner web 12 is also provided with outwardly inclined rim seats 15, 15 also equally spaced about the wheel in staggered relation with respect to seats 13 or in axial alignment with cutaway portions 14 of the outer web 11. The inner web 12 may be cut away as at 16, 16 between seats 15 for a purpose to be described, but so far as the demountable features of the wheel rims are concerned, may be formed with a continuous rim seat. On web 12 there is shown the usual brake drum 17 formed with fins 17ª, 17ª for dissipating heat therefrom.

The wheel as thus described is adapted to receive demountable rims of the attached clamp type, the rims either having seats formed thereon or attached wedge clamps being employed. In the drawings the rims 18, 18 of a known type are provided with attached wedge clamps 19, 19 arranged to engage respectively on seats 13 and seats 15 and adapted to be urged axially onto said seats by nuts 20, 20 on bolts 21, 21 extended through said clamps and threaded respectively into webs 11 and 12.

It will be apparent that cutaway portions 14 permit of sliding a rim 18 onto the inner seats 15 by aligning the clamps 19 therewith. The positions of the inner rim seats 15 are such that the nuts 20 can be actuated to clamp the rim in place by means of a wrench operable through the cutaway portions in the outer web 11.

To facilitate the positioning of the inner rim, there is provided a circumferential series of transverse webs 22, 22 extending from the web 11 inwardly of the seats 13 to the web 12, the outer edges of webs 22 providing guides on which a rim 18 may ride into place on the inner seats 15.

Webs 22 are adapted during rotation of the wheel to create currents of air about the wheel under the rims 18 to convey heat from the brakes away from said rims, the turbulence being enhanced by providing apertures such as shown at 23 in each web 22. The cutaway portions on both the inner and outer web portions permit effective circulation of air about the inner surfaces of the rims.

Both mounting and demounting of rims 18 are easily accomplished as will be readily understood. The attached clamps 19 of a rim 18 may be aligned with cutaway portions 14 to clear the outer web 11 when mounting or demounting a rim on the inner seats 15, the webs 22 serving as a guide for the rim and the cutaway portions 14 providing spaces for the use of a long-armed wrench in cooperation with the inner nuts 20. During rotation of the wheel, whirling currents of air, induced by webs 22, rapidly dissipate heat away from the inner portions of the tire and prevent blistering of the beads.

Modifications of the invention may be resorted to without departing from the spirit thereof or the scope of the appended claims.

What is claimed is:

1. A dual wheel and rim construction including a wheel having inner and outer axially spaced peripheral rim seating portions a pair of rims adapted to be seated on said inner and outer seating portions, transversely extending webs between the outer and inner seating portions for guiding the rim onto the inner seating portion, said webs being apertured and adapted to induce currents of air about the inner surfaces of the rims during rotation of the wheel.

2. In a dual wheel construction, a wheel body comprising spaced apart inner and outer rim-seating portions, said outer seating portion being constructed to permit passing a rim thereover onto the inner seating portion, and means for guiding a rim onto the inner rim-seating portion comprising axially extending members between said seating portions.

3. A dual wheel and rim construction including a wheel having a pair of axially spaced segmental rim seating surfaces, inner and outer rims seated upon said surfaces, means for securing the rims upon said surfaces, and transversely extending webs between the outer and inner seating surfaces for guiding the inner rim onto its seating surface, said webs being further adapted to induce currents of air about the inner surfaces of the rims during rotation of the wheel.

4. In a dual wheel construction, a wheel body comprising spaced apart inner and outer rim-seating portions, and means for guiding a rim onto the inner rim-seating portion comprising axially extending web members between said seating portions, said web members being adapted for inducing circulation of air about said wheel by rotation of the wheel.

5. A dual wheel and rim construction having a hub portion, two series of spokes projecting outwardly therefrom, transverse webs extending between the inner and outer series of spokes, said webs operating to support and guide the inner tire rim when being slid over the wheel onto said inner rim seats.

JOSEPH G. SWAIN.